Patented Apr. 7, 1936

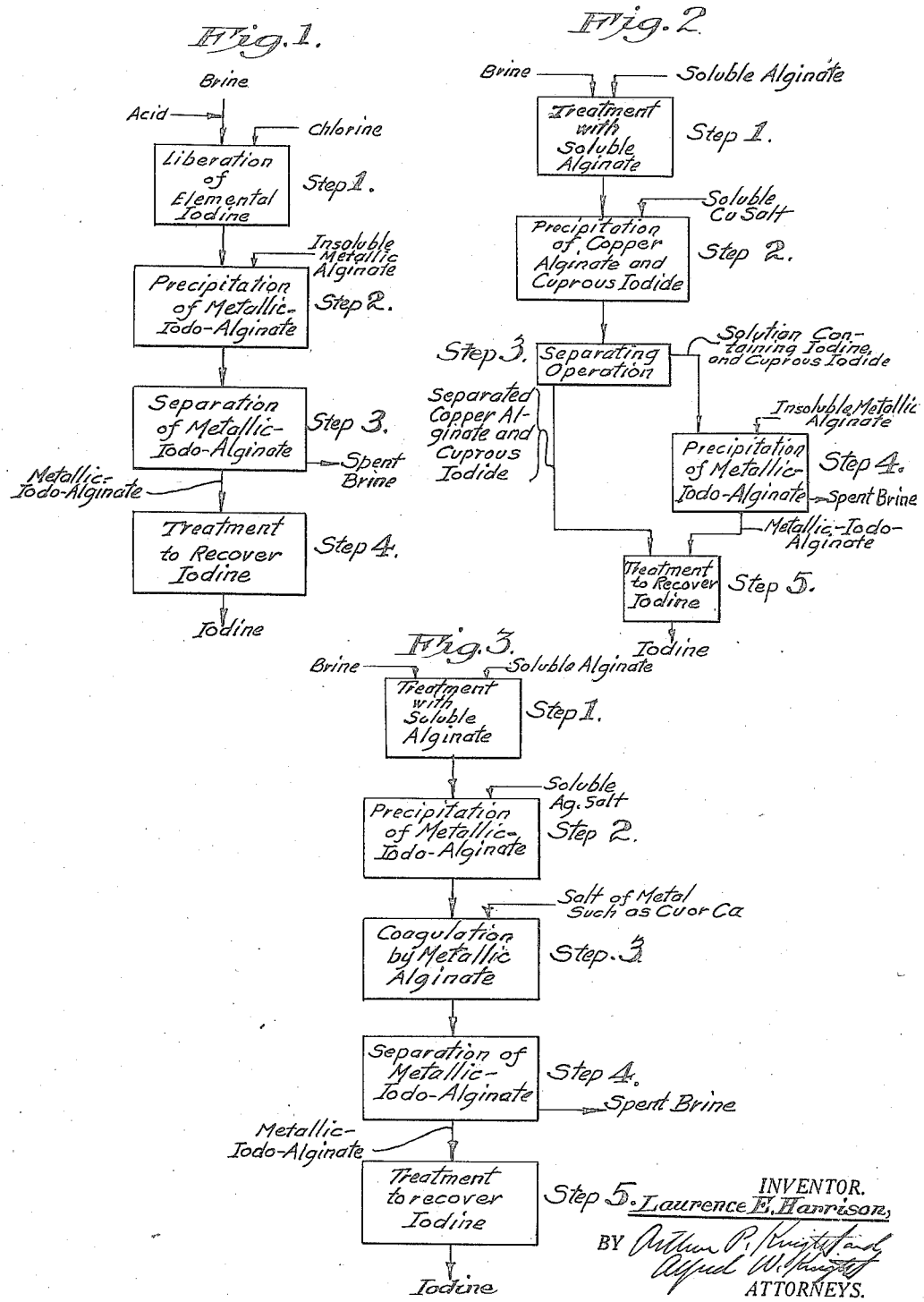

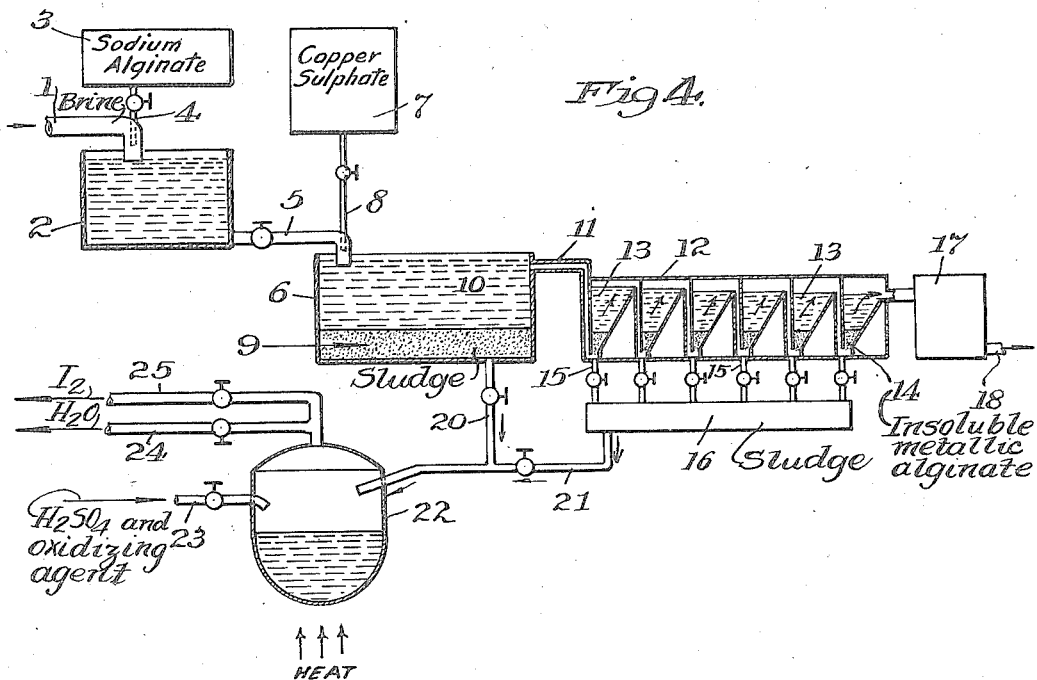

2,036,214

UNITED STATES PATENT OFFICE 2,036,214

PROCESS FOR RECOVERING IODINE FROM BRINES

Laurence E. Harrison, Los Angeles, Calif., assignor to IO-Dow Chemical Company, Inc., Long Beach, Calif., a corporation of Louisiana Application December 11, 1933, Serial No. 701,739

13 Claims. (Cl. 23—217)

This invention relates to the recovery of halogens from halogen-containing brines, and particularly to the recovery of iodine from oil field brines or other aqueous solutions containing iodine in elemental or combined form.

According to the prior art, iodine-containing brines have been treated with an oxidizing agent to liberate the combined iodine, and then treated to recover the iodine therefrom, for example, by reacting the elemental iodine to form a highly insoluble precipitate, or by adsorbing the elemental iodine on charcoal or the like. Numerous difficulties arise in the recovery of iodine according to either of the above-defined methods, in the first instance due to the difficulty of maintaining advantageous conditions during the iodine liberation step and precipitation step in order that the iodine-containing precipitate may be obtained in an easily recovered form, and in the second instance, due principally to the presence of or formation of organic iodine compounds which interfere with the adsorption or subsequent recovery of iodine. Hitherto proposed processes for recovery of iodine by precipitation methods have been found highly critical and have required very close control to insure obtaining a precipitated iodine compound which is insoluble and non-colloidal. The process of the present invention pertains generally to the type of process which involves reacting the liberated iodine with a precipitating agent, according to at least one embodiment, but differs from such processes in that the preferred reagent used to precipitate or separate the iodine is in itself a highly insoluble material, whereby important economies in the recovery of such iodine are obtained.

The principal object of the present invention is to provide a relatively simple process for the recovery of iodine from dilute solutions thereof in elemental or combined form which may be practiced without close chemical or other control and at a low cost.

A further object of the invention is to provide a process for the recovery of iodine from an iodine-containing brine involving the precipitation or recovery of the iodine as a highly insoluble non-colloidal organic compound whereby a very high recovery is effected.

A further object of the invention is to provide a process of the character set forth which is useful in the recovery of iodine from dilute solutions thereof, whether the iodine is in elemental or combined state.

A further object of the invention is to recover iodine from an iodine-containing brine through the agency of an insoluble reactive agent.

A further object of the invention is to provide an iodine recovery process whereby, through the agency of an insoluble organic reactive agent comprising a compound containing an alginic radical and a metal selected from the group consisting of silver, mercury, copper and lead, the iodine is precipitated as an insoluble iodine-containing organic material containing the aforementioned alginic and metal radicals.

The process of the present invention is applicable to the recovery of iodine from iodine-containing brines in any one of a number of related procedures, providing a number of alternative processes closely related and based principally upon recovery of the iodine as an insoluble material containing an alginic radical, but differing in certain preliminary steps. For example, the iodine may or may not be liberated from its compounds in a preliminary step; the precipitating reagent may be formed in the presence of the iodine or may be separately formed and contacted with the iodine or iodine compounds; the reagent may be added to or formed in a body of the brine and the resulting iodine-containing precipitate separated therefrom in any suitable manner, or the brine may be passed through or in contact with a segregated body of the reagent; any contaminating materials such as silt-like mineral materials and oily materials or compounds may be removed from the brine before treatment thereof for the recovery of the iodine or may be removed from the brine coincidently with the removal of a portion of the iodine, and the like.

It will be appreciated that numerous iodine-containing brines are available for practice of the present invention, many of which are relatively pure as regards contaminating materials such as insoluble mineral matter, oily matter and the like, and while the present process is fully effective in the treatment of such relatively pure brines, its particular effectiveness lies in the recovery of iodine from brines which contain a material proportion of such contaminating materials. For the purpose of description, the iodine-containing brine with which the present invention may be practiced is considered to be an oil-well brine which may contain an appreciable quantity of silt-like material, oily matter such as crude petroleum, and dissolved organic acids which may be associated with petroleum materials, such as naphthenic acid and the like. In the recovery of iodine from oil well brines, such as are found in the Long Beach and Huntington Beach oil fields in California, it has been hitherto found that unless the oily matter is substantially completely removed before liberation of the iodine from its compounds is made, the oily matter will dissolve an appreciable proportion of the liberated iodine and substantially lower the efficiency of recovery thereof. Furthermore, in processes involving adsorption on charcoal or the like, it has been found necessary to remove the principal proportion of silt-like and organic material from the brine before the adsorption step so that the adsorbent is not contaminated thereby. These preliminary purification steps may be eliminated in the practice of the present invention, and thus a further important economy realized.

The process of the present invention may comprise, in its preferred embodiment, treating an iodine-containing brine with an insoluble reagent containing a metal radical and an alginic radical to form an insoluble precipitate containing iodine, a metal radical, and an alginic radical, the metal radical being selected from the group consisting of silver, mercury, copper and lead. The treatment of the brine with the insoluble reagent above-mentioned may be carried out either by forming such reagent separately and bringing it into contact with the brine, or by forming such reagent in place in the brine itself. In the subsequent description, the insoluble reagent above referred to and comprising a metal radical selected from the above-defined group and an alginic radical, will be referred to as a "metallic alginate", or in specific cases, as one containing a particular metal radical, for example, silver alginate. The insoluble iodine-containing precipitate will be hereinafter referred to as a "metallic-iodo-alginate" or more specifically, silver-iodo-alginate, as an example. It will be appreciated that it is not definitely known that the metallic radical and alginic radical are combined as a metallic salt of alginic acid, but analyses of the reagent when prepared by adding a soluble silver salt to a solution of alginic acid or sodium alginate indicate that a true salt is formed, having a composition generally expressed by the formula

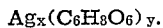
$Ag_x(C_6H_8O_6)_y$.

Likewise it is not definitely known that the metallic-iodo-alginate precipitate is a fixed chemical compound, but analysis of such material indicates a composition expressed by the formula

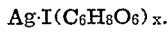
$Ag\cdot I(C_6H_8O_6)_x$.

As an example of a relatively simple embodiment of the present invention, an iodine-containing brine may be subjected to a settling operation to remove the principal proportion of any silt-like contaminating material, and mixed with an insoluble metallic alginate such as silver alginate or any alginate of a metal of the group consisting of silver, mercury, copper or lead, so as to cause formation of a precipitate containing said metal, the alginate radical and iodine. The insoluble iodine containing precipitate, referred to above as a metallic-iodo-alginate precipitate, may then be subjected to a retorting with sulphuric acid and if necessary, with a suitable oxidizing agent, whereby it is brokn down and the iodine driven off by the application of heat, and subsequently condensed as elemental iodine.

The insoluble metallic alginate used in the present process may be prepared in any well-known manner, for example by digesting kelp or sea-weed such as the alga *Macrocystis pyrifera* with a dilute alkaline solution, such as a 2 to 4 per cent solution of sodium carbonate, separating the digested alginic acid and sodium alginate from any undisintegrated kelp and precipitating the insoluble alginate by adding a soluble salt of a metal taken from the above-defined group, forming a reagent which may be used to contact the brine; or, the digested alginic acid and sodium alginate may be added to the iodine-containing brine and then a soluble metal salt added to cause precipitation of the reagent in the presence of the iodine, as is subsequently described. In the preparation of a metallic alginate to be used in contact with the brine, I prefer, however, to omit the alkaline digestion step above-described, and form the insoluble metallic alginate by a direct reaction of a soluble salt of a metal of the above group with a pulp prepared by grinding or macerating a suitable kelp or sea-weed. In this procedure, the insoluble metallic alginate is formed in the presence of a relatively large amount of organic matter other than alginic acid, such other matter consisting principally of cellulose and other hexoses, and it has been found that the presence of such other organic matter in no way interferes with the efficiency of the metallic alginate. I have found that, in the preparation of a silver alginate specifically, the addition of a small amount of a soluble copper salt, such as $CuSO_4$, acts to thoroughly coagulate the silver alginate precipitate formed by either of the above procedures, so that it may be readily separated from a brine by decantation or filtration.

A salt of any other metal which forms a highly insoluble alginate may be used to coagulate the above-defined alginate, for example, calcium chloride has been found highly satisfactory.

When the metallic alginate is prepared by reaction with a kelp pulp, as above set forth, the brine to be treated may be filtered through a suitable mass of the reagent to obtain the desired contact and recovery of the iodine, or a suitable quantity of the reagent may be mixed with the brine and then allowed to settle. The iodine-containing reagent may be treated with sulphuric acid as above described to recover the iodine and the metal, or may be dried and retorted in a suitable muffle furnace at a dull red heat to cause calcination and charring of the organic matter, after which the temperature may be increased and the material further calcined in the presence of air and the iodine driven off in elemental form and subsequently condensed.

The above process is effective in the recovery of iodine from brines containing the same in either elemental form or combined form as an iodide, and while the specific chemical phenomena accompanying the recovery reaction are not definitely known, many laboratory experiments using solutions of pure iodine compounds and a carefully prepared insoluble metallic alginate such as silver alginate, have resulted in obtaining an insoluble organic iodine compound which analyzes substantially according to the above formula.

The above process may be modified in any one of several ways, and I have found that the brine may be subjected to preliminary treatment steps, particularly when a relatively large quantity of oily matter and organic acids are present in the brine. As examples of several modifications of the present process, I have employed procedures of the following type:

I

1. Liberation of elemental iodine chemically or electrolytically.
2. Contact of liberated iodine with insoluble metallic alginate.
3. Separation of insoluble organic iodine compounds.
4. Recovery of iodine from precipitate by retorting or calcination.

II

1. Treatment of brine with a soluble alginate such as sodium alginate or alginic acid.
2. Precipitating alginate by addition of copper sulphate.
3. Separation of the precipitate formed in (2).
4. Treatment of filtrate from (3) with insoluble metallic alginate.
5. Recovery of iodine from precipitates obtained in steps 3 and 4.

III

1. Treatment of brine with soluble alginate.
2. Addition of soluble metal salt such as of silver to form insoluble metallic-iodo-alginate.
3. Addition of copper sulphate, calcium chloride or the like to coagulate precipitate from 2.
4. Separation of precipitate formed in 3.
5. Recovery of iodine from precipitate obtained in 4.

The accompanying drawings illustrate the above outlined embodiments of the process, and apparatus which may be used in carrying out one of these embodiments, and referring thereto:

Figs. 1, 2, and 3 are flow sheets illustrating the modifications of the process identified above as types I, II, and III;

Fig. 4 illustrates diagrammatically a suitable arrangement of apparatus for carrying out the process according to type II.

As examples of typical iodine-recovery procedures, the following examples A, B and C are given respectively as specific processes of the type outlined under I, II and III.

*Example A.*—This process is effectively employed where the iodine-containing brine is not badly contaminated with oily matter and may comprise first subjecting the brine to a settling operation to remove any silt or other material which may be easily separated. Referring to the flow sheet in Fig. 1, the brine is then acidified to a pH value of between 3 and 4 and chlorine added (step 1). The oxidation of the brine in this manner will convert the combined iodine into elemental iodine, assuming the iodine to be present as an iodide such as sodium iodide, and, due to the relatively low percentage of iodides present in the brine, the liberated elemental iodine will go into solution in the brine. The brine containing the liberated iodine is then brought into contact with an insoluble metallic alginate reagent (such as silver alginate prepared as above described) and the iodine taken up thereby (step 2). The iodine-containing metallic alginate, or, to use my preferred nomenclature, the metallic-iodo-alginate, is then separated from the treated brine (step 3) and the separated material subjected to treatment for recovery of the iodine in elemental form. This step (step 4) may consist in retorting the insoluble material with sulphuric acid which will break down the compound and permit recovery of the iodine by sublimation and also permit recovery of the metallic radical as a sulphate, which may be extracted from the residue according to any well known process. Under some conditions I prefer to add a small amount of an oxidizing agent such as sodium nitrate in the retorting step so as to facilitate liberation of the iodine. As an alternative process for recovering the iodine from the metallic-iodo-alginate the material may be calcined in a suitable muffle or the like to char the organic matter, after which the material may be further heated in the presence of oxygen or atmospheric air and the iodine driven off by sublimation. The metallic radical may be subsequently recovered by extraction with a suitable acid.

*Example B.*—This process is effectively employed where the brine is contaminated with a relatively large amount of oily matter in emulsified condition, that is, contaminated with oily matter which is not easily removed in a settling and skimming operation. According to this example of the present invention, the brine may be first subjected to a settling step as above described to remove a portion of the silt and such oily matter as can be so removed. As shown in Fig. 2, a solution of sodium alginate or alginic acid is then mixed with the brine (step 1) in an amount approximating 0.01 per cent of the weight of the brine. The alginate-brine mixture is then treated with a small amount of a soluble copper salt, such as $CuSO_4$ in water solution, which reacts with the alginate to precipitate copper alginate and causes the remaining silt and oily matter to be carried down by entrainment in the precipitate. Sufficient copper reagent is added in this step to also react with and convert the combined iodides into cuprous iodide and elemental iodine according to the reaction,

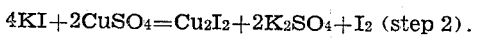

$$4KI + 2CuSO_4 = Cu_2I_2 + 2K_2SO_4 + I_2 \text{ (step 2)}.$$

This reaction thus converts half of the iodine into cuprous iodide and the other half of the iodine into elemental iodine. The cuprous iodide is relatively insoluble and will precipitate with the copper alginate. A portion of the liberated iodine is absorbed by or taken up by the precipitated copper alginate and the brine then contains iodine in solution, cuprous iodide in solution, and a small proportion of cuprous iodide in colloidal suspension. The precipitated material is allowed to settle (step 3) and the supernatant brine may then be passed through a suitable contact trough containing a precipitated metallic alginate, such as silver alginate (step 4) in which step the dissolved iodine and cuprous iodide are taken up by the alginate with the formation of the above-mentioned metallic-iodo-alginate. The effluent from this step may be passed through a vat or tank containing iron filings or turnings, and the excess copper recovered therein. In this Example B it will be noted that no attempt is made to convert the combined iodine into elemental form as a preliminary step. The contaminating silt and oily matter is carried down with the precipitated cuprous iodide and if any iodine is taken out of solution by the oily matter, this oily matter is caused to remain in a precipitate which may be subsequently treated to recover the iodine therefrom. The precipitate recovered in step 2 and the contacted metallic alginate resulting from step 4 may be separately treated according to either of the above-described recovery procedures to obtain the iodine as an elemental product (step 5).

*Example C.*—This modification of the present invention, as illustrated by the flow sheet in Fig. 3, is preferably practiced as an alternative to Example A, that is, it is preferably used when the brine to be treated does not contain an appreciable amount of emulsified oily matter. After removal of some of the silt by a settling step such as above-described, a small amount of soluble alginate such as sodium alginate or alginic acid is added to the brine as in step 1 in Example B. A soluble salt such as a silver sulphate or silver nitrate is then added in solution to the brine in an amount slightly in excess of the theoretical amount required to combine with the known amount of iodine in the brine (step 2), the amount of alginate previously added being slightly in excess of that which would be combined with the added metallic ion, so that a slight excess of alginate is present after the addition of the silver salt. This causes a more or less colloidal precipitation of silver alginate in the presence of the iodine contained in the brine, and this iodine is immediately taken up by the insoluble alginate. This insoluble silver-iodo-alginate is then preferably coagulated and caused to settle by the addition of an amount of copper sulphate, or other suitable salt, such as calcium chloride, sufficient to react with the excess alginate and form an insoluble metallic alginate (step 3). The precipitated metallic-iodo-alginate may then be separated from the iodine-free brine by decantation or filtration (step 4), and then subjected to treatment to recover the iodine (step 5) as set forth in Example A.

In Fig. 4, I have shown in schematic form an arrangement of apparatus which may be employed to carry out the steps in a process such as set forth under Example B. This is given merely by way of example, and it will be appreciated that the apparatus arrangement may be modified according to the particular type of recovery process employed. Referring to Fig. 4, the brine inlet is shown at 1 leading to a mixing tank 2. A supply of the soluble alginate such as sodium alginate is shown at 3, provided with duct means 4 associated with the inlet 1 in such manner as to provide concurrent introduction of brine and sodium alginate solution to the tank 2. This particular arrangement is not essential, as the brine and soluble alginate may be added separately if desired, but it has been found that this particular arrangement provides for satisfactory intermixing of the brine and alginate. The intermixed brine and alginate may then be conducted through a conduit 5 to a reaction tank 6, and a suitable amount of copper sulphate solution from tank 7 may be added to and intermixed with the alginate brine as at 8. The precipitate of iodine-containing copper alginate and cuprous iodide forms within the tank 6 and settles to the bottom to form a sludge as shown at 9. The supernatant liquor 10 is then passed through a conduit 11 into and through a contact trough 12 which may comprise a plurality of baffled reaction cells 13 within each of which a supply of the insoluble metallic alginate reagent is provided as at 14. The alginate reagent 14 is relatively heavy, and the brine is forced through the reagent against the action of gravity and in this way no loss of the precipitated alginate is experienced, and the brine is thoroughly contacted thereby. The several cells 13 may be provided with outlet means 15 at their lower ends, which may communicate with a manifold or header 16 within which the contacted alginate may be stored. The over-flow from trough 12 may pass into a contactor 17 filled with iron filings or the like for recovery of dissolved copper, and the brine withdrawn at 18 to waste. The sludge 9 or the alginate recovered at 16 may be either or both conducted through suitable conduits 20 and 21 to a retort 22, to which sulphuric acid and, if desired, an oxidizing agent, may be added as at 23 and the sludge or precipitate broken down by heating and water vapor first driven off through an outlet 24 and subsequently iodine driven off through an outlet 25, a suitable condenser being provided for recovery of the iodine in crystalline form.

When the above example of the present process is practiced, the vitiated brine discharged at 18 will be substantially uncontaminated with oily matter, silt, or reagents. The above process will remove the desired iodine, the contaminating oil and silt, and does not add any constituents to the brine which are in any sense objectionable. A slight trace of copper salts may be found in the brine before passing through the collector at 17, but these salts are converted in said collector into iron salts which are not particularly objectionable and which are not present in any great amount. The brine can thus be discharged into a sewer system without danger to piping, or may be discharged into the ocean without danger to fish life. This is an important feature in the vicinity of such cities as place restrictions upon what may be passed to waste into the ocean, and is of particular importance in a location near where the restrictions are vigorous.

It will be appreciated that other procedures may be adopted to obtain the desired contact of the reagent with the brine, for example, the brine may be filtered or percolated through a column of the reagent, or a centrifugal filter may be employed. If desired a suitable electric potential may be maintained between the unfiltered brine and the reagent filtering material, after the manner shown in United States Patent to Cottrell, No. 1,921,564, when a variable valence metal of the above-defined group is used to form the metallic alginate, so as to maintain the metal in its lowest valence without actually reducing it to metallic state. Under some conditions, when copper salts are used to form the metallic alginate, a reducing agent such as ferrous sulphate or the like may be added to the brine to prevent formation of soluble cupric iodide compounds or liberation of free iodine.

I claim:

1. In a process for recovering iodine from iodine-containing brines the step which comprises adding to such a brine an alginic radical and a metallic radical capable of forming with iodine and said alginic radical a precipitate containing iodine, a metallic radical, and an alginic radical, to form such a precipitate.

2. In a process for recovering iodine from brines containing iodine, the steps which comprise converting any combined iodine in the brine to elemental iodine and then adding to the brine an alginic radical and a metallic radical which will form a precipitate containing iodine, a metallic radical, and an alginic radical.

3. A process for recovering iodine from iodine-containing brines which comprises: adding a small amount of a soluble alginate to such brine; adding a soluble salt of silver in an amount at least equivalent to the quantity of iodine present in the brine to form a precipitate containing silver, an alginic radical, and iodine; coagulating said precipitate by the addition of a small amount of a soluble salt of a metal capable of forming an insoluble metallic alginate; separating the coagulated precipitate from the brine; and recovering the iodine from said precipitate.

4. A process for recovering iodine from iodine-containing brines which comprises: adding a small amount of a soluble alginate to such brine; adding a soluble salt of silver to such brine in an amount at least equivalent to the quantity of iodine present to form a precipitate containing silver, an alginic radical and iodine, said soluble alginate being added in an amount slightly in excess of that which will react with the added silver salt; adding a solution of a copper salt to said brine in an amount sufficient to react with excess soluble alginate to form copper alginate and coagulate the first-mentioned precipitate; separating the coagulated precipitate from the brine; and recovering the iodine from said precipitate.

5. A process for recovering iodine from iodine-containing brines which comprises: adding a soluble alginate to such brine; then adding to said brine a soluble copper salt which will cause the formation of a precipitate containing an alginic radical, copper and iodine and also cause the liberation of part of the iodine contained in the brine as elemental iodine in solution; separating the precipitate from said brine; passing said separated brine into contact with an insoluble metallic alginate reagent to cause removal of said dissolved elemental iodine from said brine and formation of a metallic-iodo-alginate; separating said metallic-iodo-alginate from the treated brine and recovering the iodine from said separated precipitate and said metallic-iodo-alginate.

6. In a process for recovering iodine from iodine-containing brines the steps which comprise: forming, in such a brine a precipitate containing an alginic radical, copper and a portion of the iodine contained in said brine, separating said precipitate from said brine; and subsequently contacting the separated brine with an insoluble reagent containing an alginic radical which will react with and remove the remainder of the iodine contained in said brine.

7. In a process for recovering iodine from brines containing the same, the steps which comprise: forming an iodine-containing precipitate in such a brine, and forming in the brine, in the presence of said precipitate, an insoluble metallic alginate which will cause coagulation of said iodine-containing precipitate.

8. A process for recovering iodine from iodine-containing brines which comprises: adding a small amount of a soluble alginate to such brine; adding a soluble salt of silver to such brine in an amount at least equivalent to the quantity of iodine present to form a precipitate containing silver, an alginic radical and iodine, said soluble alginate being added in an amount slightly in excess of that which will react with the added silver salt; adding to said brine, in an amount sufficient to react with such excess soluble alginate, a salt of a metal adapted to form a highly insoluble precipitate with an alginate to form a metallic alginate and coagulate the first-mentioned precipitate; separating the coagulated precipitate from the brine; and recovering the iodine from said precipitate.

9. In a process for recovering iodine from iodine-containing brines, the step which consists in treating such a brine with an insoluble metallic alginate capable of forming an insoluble metallic-iodo-alginate.

10. In a process for recovering iodine from iodine-containing brines, the step which comprises treating such a brine with silver alginate.

11. In a process for recovering iodine from iodine-containing brines, the step which comprises treating such a brine with copper alginate.

12. In a process for recovering iodine from iodine-containing brines, the steps which consist in liberating elemental iodine in the brine and then treating the brine with an insoluble metallic alginate capable of forming an insoluble metallic-iodo-alginate.

13. In a process for recovering iodine from iodine-containing brines, the steps which consist in liberating elemental iodine in the brine and then treating the brine with silver alginate.

LAURENCE E. HARRISON.